(12) United States Patent
Baker et al.

(10) Patent No.: US 9,350,940 B1
(45) Date of Patent: May 24, 2016

(54) PRIVACY CONTROL FOR A VISUAL-COLLABORATIVE SYSTEM

(75) Inventors: Mary G. Baker, Palo Alto, CA (US); Ian N. Robinson, Pebble Beach, CA (US); Mitchell Trott, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1123 days.

(21) Appl. No.: 12/608,807

(22) Filed: Oct. 29, 2009

(51) Int. Cl.
H04N 7/14 (2006.01)

(52) U.S. Cl.
CPC .................................... *H04N 7/141* (2013.01)

(58) Field of Classification Search
USPC ........................................ 348/14.01; 381/73.1
See application file for complete search history.

(56) References Cited

U.S. PATENT DOCUMENTS

| | | | |
|---|---|---|---|
| 5,914,747 A | 6/1999 | Hamilton | |
| 6,674,458 B1* | 1/2004 | Cohen-Solal | H04N 7/147 348/14.01 |
| 6,765,608 B1* | 7/2004 | Himeda | H04N 5/232 348/14.01 |
| 8,355,038 B2* | 1/2013 | Robinson | G06F 3/04883 348/14.01 |
| 2006/0140475 A1* | 6/2006 | Chin et al. | 348/14.01 |
| 2006/0182365 A1* | 8/2006 | Park | G06K 9/00664 382/261 |
| 2007/0229652 A1* | 10/2007 | Center et al. | 348/14.08 |
| 2008/0259154 A1* | 10/2008 | Garrison et al. | 348/14.01 |
| 2009/0278913 A1* | 11/2009 | Rosenfeld | H04N 7/144 348/14.16 |
| 2010/0062754 A1* | 3/2010 | Allen et al. | 381/73.1 |

FOREIGN PATENT DOCUMENTS

WO  WO 2009066219 A1 * 5/2009

OTHER PUBLICATIONS

Roussel, Nicolas "Beyond "Beyond Being There": Towards Multiscale Communication Systems", *MM '07Augsburg*, Bavaria, Germany., (Sep. 23-28, 2007),238-246.

Chatting, David J., et al., "Presence and Portrayal: Video for casual home dialogues", *MM '06 Santa Barbara*, California, USA., (Oct. 23-27, 2006),395-401.

* cited by examiner

*Primary Examiner* — Stella L Woo
(74) *Attorney, Agent, or Firm* — HP Inc Patent Department

(57) ABSTRACT

A visual-collaborative system including a display screen configured to display images captured at a remote location and a camera configured to capture an image of an object to be transmitted to a remote location. The visual-collaborative system also includes a privacy controller configured to transmit the image comprising a first fidelity in response to the object located in a designated proximity area and to transmit the image comprising a second fidelity in response to the object located outside the designated proximity area.

18 Claims, 5 Drawing Sheets

500

```
┌─────────────────────────────────────────────────────────────┐
│  display images captured at a remote location on a display  │
│                   screen at a local location                │
│                             510                             │
└─────────────────────────────────────────────────────────────┘
                              │
                              ▼
┌─────────────────────────────────────────────────────────────┐
│  capture an image of an object by a camera at the local     │
│         location for transmission to the remote location    │
│                             520                             │
└─────────────────────────────────────────────────────────────┘
                              │
                              ▼
┌─────────────────────────────────────────────────────────────┐
│  control privacy at the local location with respect to the  │
│  remote location based on transmitting the image comprising │
│  a first fidelity in response to the object located in a    │
│  designated proximity area and transmitting the image       │
│  comprising a second fidelity in response to the object     │
│         located outside the designated proximity area       │
│                             530                             │
└─────────────────────────────────────────────────────────────┘
```

FIG. 5

PRIVACY CONTROL FOR A VISUAL-COLLABORATIVE SYSTEM

FIELD

Embodiments of the present technology relate generally to the field of remote collaborative systems.

BACKGROUND

Video teleconferencing systems have few or no privacy controls. For example, a person being viewed by another person at a remote location typically controls the privacy by turning off the camera, placing a lens cap on the camera and/or exiting the viewing range of the camera. Also, even if a local user is intending to be viewed by a remote user, the local user cannot control the viewing of any objects behind the user and/or any additional sounds in proximity to the user.

Video teleconferencing systems can be awkward and a potential liability in some environments (e.g., a home), since it is often not obvious and/or intuitive to a user that a video teleconferencing system is transmitting signals (e.g., audio/visual) to a remote location. For example, a user might not be able to determine what is displayed to a remote user. The user may be unaware that the camera is capturing images of the user. Likewise, a user might also be unable to determine that a microphone is capturing audio.

BRIEF DESCRIPTION OF THE DRAWINGS

FIG. 5 illustrates an example of a flow chart of a method for providing privacy for a visual-collaborative system, in accordance with an embodiment of the present invention.

Figure 1:
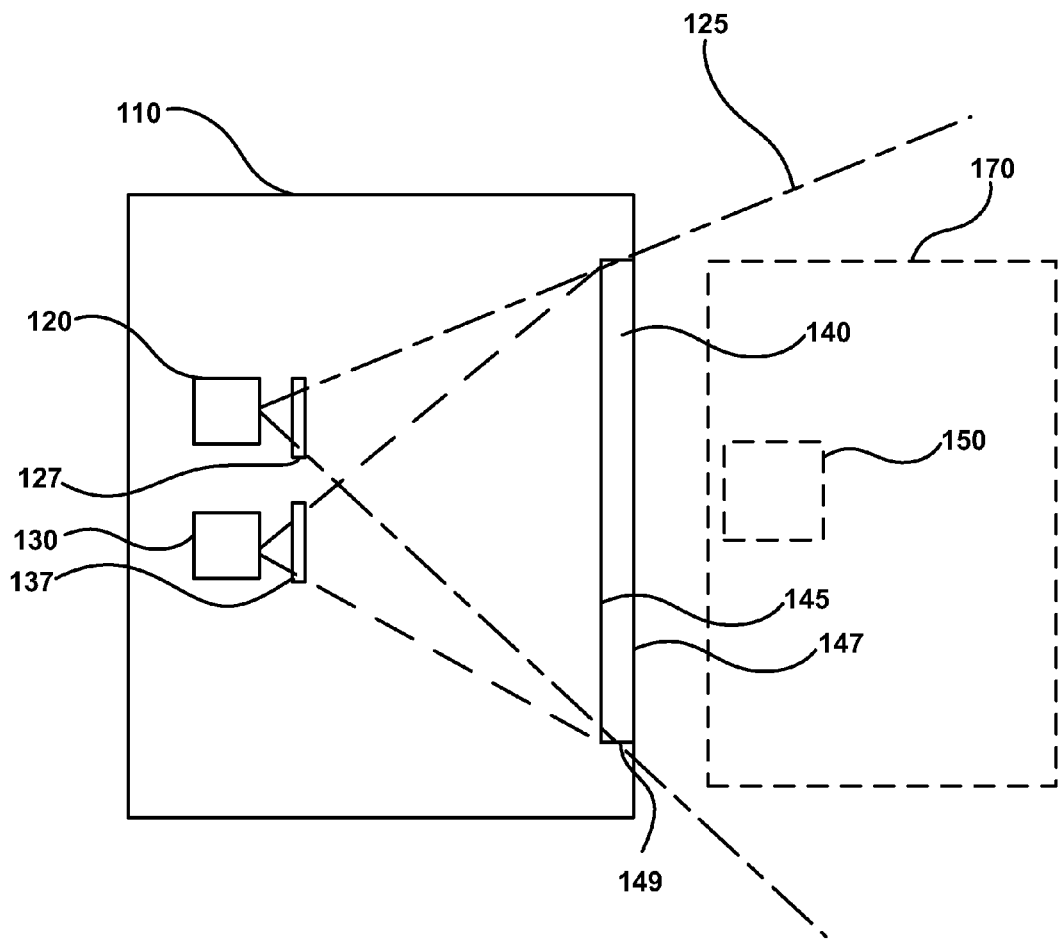
FIG. 1 illustrates an example of a visual-collaborative system, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Visual-collaborative systems or remote telepresence systems are intended to look and feel as if they are a window or a port through which people in remote locations can naturally interact as if they were in close proximity. If a visual-collaborative system were in a home environment, it might be convenient that the visual-collaborative system were always available, such that users in different geographic locations can truly feel that they are communicating face-to-face. For example, a visual-collaborative system at location A is placed on a living room wall to allow natural interaction with a family member residing at location B, who has a corresponding visual-collaborative system hanging on a living room wall.

However, a user of a visual-collaborative system (even with family members) should maintain natural privacy by controlling privacy and presence indication of the visual-collaborative system. For instance, User A at location A would control (1) when a user B could view User A, and (2) the circumstances in which User A is viewed by User B.

Embodiments of the present invention are directed to visual-collaborative systems. Typically, visual-collaborative systems enable geographically distributed groups or individuals to engage in face-to-face, interactive collaborative video communication. It should be appreciated that a visual-collaborative system includes: a camera disposed at any location that is compatible to capture images (e.g. images of a user and/or associated objects) to be transmitted to a corresponding remote visual-collaborative system and a display screen configured to display images captured at a remote location and transmitted to a local visual-collaborative system.

Specific examples will follow in which visual-collaborative systems include a camera that captures images through a display screen. It will be understood that other visual-collaborative systems can include cameras at any compatible location (as described above), however, for the purposes of brevity and clarity, examples of visual-collaborative systems will be used that capture images through a display screen.

In one embodiment, the system includes a projection display screen that enables cameras to capture images of the local objects through the display screen and send the images to a remote site. In addition, the display screen can be used to simultaneously display images from the remote site. Optionally, the systems include a touch sensing system.

FIG. 1 shows a schematic representation of a visual-collaborative system 100 configured in accordance with embodiments of the present invention. System 100 includes a display screen 140, camera 120, and projector 130. System 100 also includes a filter A or 127 disposed between the camera lens (not shown) and the screen 140 and a filter B or 137 disposed between the projector lens (not shown) and the screen 140. The camera lens and projector lens (not shown) are positioned to face the same first surface 145 of the display screen 140. In one embodiment, the screen 140 is a rear projection display screen. However, the rear projection implementation shown is for purposes of example only and the screen 140 may also be a front projection display screen.

Camera 120 has an image capture view 125. In one embodiment, the image capture view 125 corresponds with the peripheral edge 149 of display screen 140. For example, any objects outside of the image capture view 125 cannot be captured by the camera 120. Only images of objects (e.g. 150) located within the image capture view 125 can be captured by camera 120. In one embodiment, camera 120 captures images of a user (e.g., object 150) only when the user is located in a designated proximity area 170, as described in detail later.

Referring to FIG. 1, the screen 140 is a rear projection display screen comprising a screen material that diffuses light striking the first surface 145 within a first range of angles. The projector 130 is positioned to project images onto the first surface 145 within the first range of angles. A viewer (not shown) facing the outer second surface 147 of the screen 140 sees the images projected onto the screen 140 from the projector 130. The screen 140 is also configured to transmit light scattered from an object(s) 150 facing the second surface 147. In other words, the camera lens is positioned to face the first surface 145 so that light scattered off of object(s) 150 facing the second surface 147 passes through the display screen and is captured as images of the objects by the camera 120. It should be appreciated that a viewer can be represented as an object 150. Also, the second surface 147 would appear as a screen, window or mirror to a viewer.

In order to prevent ambient light from striking the first surface 145 of the screen 140 and reducing the contrast of the projected and captured images, the system 100 may also include a housing 110 enclosing the camera 120 and projector 130. The housing 110 is configured with an opening enclosing the boundaries of the screen 140 and is configured so that light can only enter and exit the housing 110 through the screen 140.

As shown in FIG. 1, filters A or 127 and B or 137 are positioned so that light output from the projector 130 passes through filter B before striking the first surface 145 and light captured by the camera 120 passes through filter A. The filters A and B are configured to prevent light produced by the projector 130 and scattered or diffused from the screen 140 from interfering with light transmitted through the screen 140 and captured by the camera 120. In one embodiment, this is achieved using complementary filters to block different components of light. In one embodiment, filter A passes through light that would be blocked by filter B. Similarly, filter B passes light that would be blocked by filter A. In this way, light from the projector 130 that is diffused or scattered off the first surface may be blocked.

If the material used for the display screen 140 maintains polarization of scattered light, and if the projectors used are the type which result in no polarization of the light output from the projectors, then polarized filters may be used. In one embodiment, the complementary filters A and B are polarizing filters, where polarizing filter A has a first direction of orientation that is different than the direction of orientation of polarizing filter B. In one embodiment, the filters are circularly polarized, where the polarization for one filter is right circularly polarized and the polarization for the other filter is left circularly polarized. In one embodiment, the two filters are polarized linearly. In this embodiment, one filter is polarized horizontally while the other filter is polarized vertically.

Visual-collaborative system 100 can include a touch sensing system (not shown). In various embodiments, a touch sensing system can include, but is not limited to, a Frustrated Total Internal Reflection (FTIR), resistive and capacitive films, infra-red (IR) emitters and sensors. It should be appreciated that a touch sensing system can be built into a screen bezel.

Figure 2:
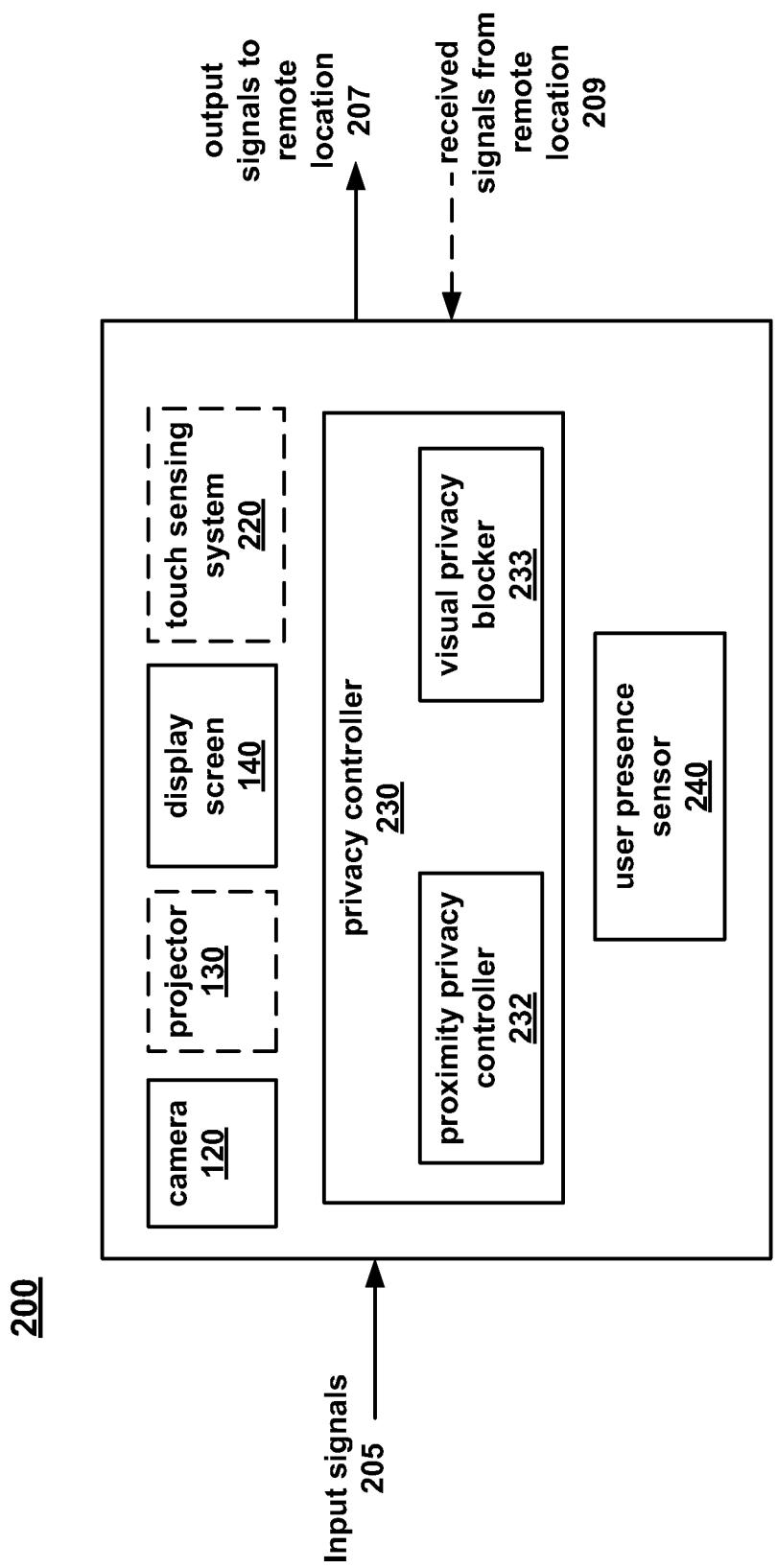
FIG. 2 illustrates an example of a visual-collaborative system, in accordance with an embodiment of the present invention.

FIG. 2 illustrates a visual-collaborative system 200, in accordance with embodiments of the present invention. Visual-collaborative system 200 includes a camera 120, projector 130 and display screen 140. Optionally, visual-collaborative system 200 includes a touch sensing system 220.

Visual-collaborative system 200 also includes a privacy controller 230. In general, privacy controller 230 is configured to control privacy of a local user of the visual-collaborative system. In particular, privacy controller 230 is configured to transmit an image comprising a first fidelity in response to an object (e.g., 150) located in a designated proximity area (e.g., 170) and to transmit the image comprising a second fidelity in response to the object located outside the designated proximity area. The privacy controller includes sensor(s) configured to detect the distance of objects from the system in order to determine whether they are within or outside the proximity area. Examples of such sensors include ultrasonic range sensors and depth cameras (depth from stereo, time of flight, or structured light). Moreover, privacy controller 230 can also indicate to a user that camera 120 is capturing an image.

It should be appreciated that it is not obvious and/or intuitive to a user that the visual-collaborative system is transmitting signals (e.g., audio/visual) to a remote location. For example, a user is not able to determine what is displayed to a remote user, therefore, the user may be unaware that the camera is capturing images of the user. Also, the camera could be on one side of a see-through screen, such that a user on the other side of the see-through screen would be unable to notice that the camera is turned on and capturing images of the user. In other words, a user is unable to determine from the camera that the camera is capturing images. Likewise, a user may also be unable to determine that a microphone is capturing audio.

Moreover, although a user may be willing to interact with a remote user, the user may wish that the area outside the proximity area is not visible to the remote user for a plurality of reasons. The area outside the proximity area could be a distraction to the remote user or an embarrassment to the local user. Also, the area outside the proximity area could contain confidential material that the local user does not wish to be viewed by the remote user. Accordingly, a designated proximity area is a way for a user to feel confident that they understand when and what signals (e.g., audio and/or video) are being captured and transmitted to a remote user.

For example, the area outside the designated proximity area could be blurred, skewed, silhouetted and/or distorted (e.g., second fidelity), while the designated proximity area is substantially undistorted (e.g., first fidelity). Also, the area outside the designated proximity area could be substantially blocked or blocked out completely (e.g., second fidelity), while the designated proximity area is undistorted or distorted (e.g., first fidelity).

In another embodiment, the privacy controller 230 can separate the audio within the designated proximity area from the audio outside the designated proximity area. For example, the audio outside the designated proximity area could be distorted by garbling (e.g., second fidelity), while the audio inside the designated proximity area is substantially undistorted (e.g., first fidelity). Also, the audio outside the designated proximity area could be substantially blocked or blocked out completely (e.g., second fidelity), while the audio inside the designated proximity area is undistorted or distorted (e.g., first fidelity).

Privacy controller 230 can include a proximity privacy controller 232 configured to provide privacy based on the user's proximity to the display screen (e.g., 140). In one embodiment, images of the user are captured within the designated proximity area, in response to a user entering a designated proximity area (e.g., 170). In another embodiment, proximity controller 232 is configured to transmit an image comprising a first fidelity in response to an object (e.g., 150) located in a designated proximity area (e.g., 170) and to transmit the image comprising a second fidelity in response to the object located outside the designated proximity area, as presented above.

Figure 3:
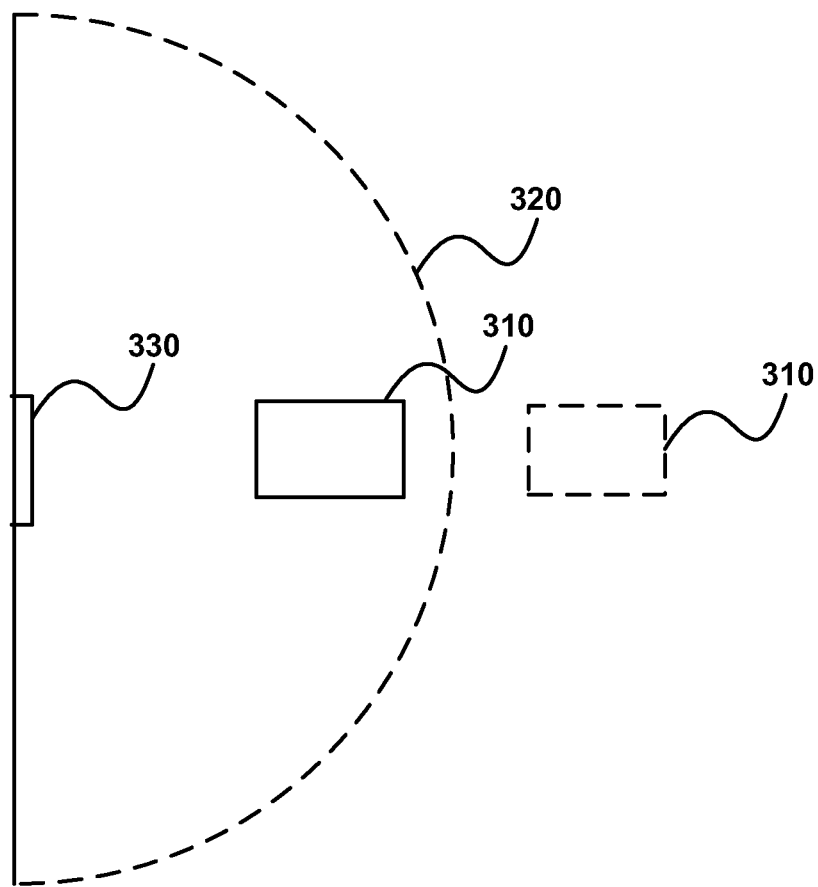
FIG. 3 illustrates an example of a visual-collaborative system, in accordance with an embodiment of the present invention.

FIG. 3 illustrates a visual-collaborative system 300, in accordance to an embodiment. Visual-collaborative system 300 includes a camera (not shown), display screen 330 and sensor(s) that create the designated proximity area 320. In one embodiment, in response to user 310 located in designated proximity area 320, an image with a first fidelity (e.g., undistorted) is transmitted. In another embodiment, in response to user 310 located outside of designated proximity area 320, an image with a second fidelity (e.g., distorted) is transmitted.

In one embodiment, visual-collaborative system 300 includes an open state. In an open state, the first fidelity of the video and/or audio is undistorted and the second fidelity of the video and/or audio is distorted. In another embodiment, visual-collaborative system 300 includes a private state. In a private state, the first fidelity of the video and/or audio is distorted (e.g., blurred or garbled) and the second fidelity is fully blocked. User 310 can choose between the open and closed states. In the open state, the user can be clearly seen by the remote user, while maintaining privacy of the area outside the designated proximity area. In the private state, presence of user 310 is evident to a remote user (via blurred image and/or garbled audio) when user 310 is in designated proximity area 320, but not otherwise.

Figure 4:
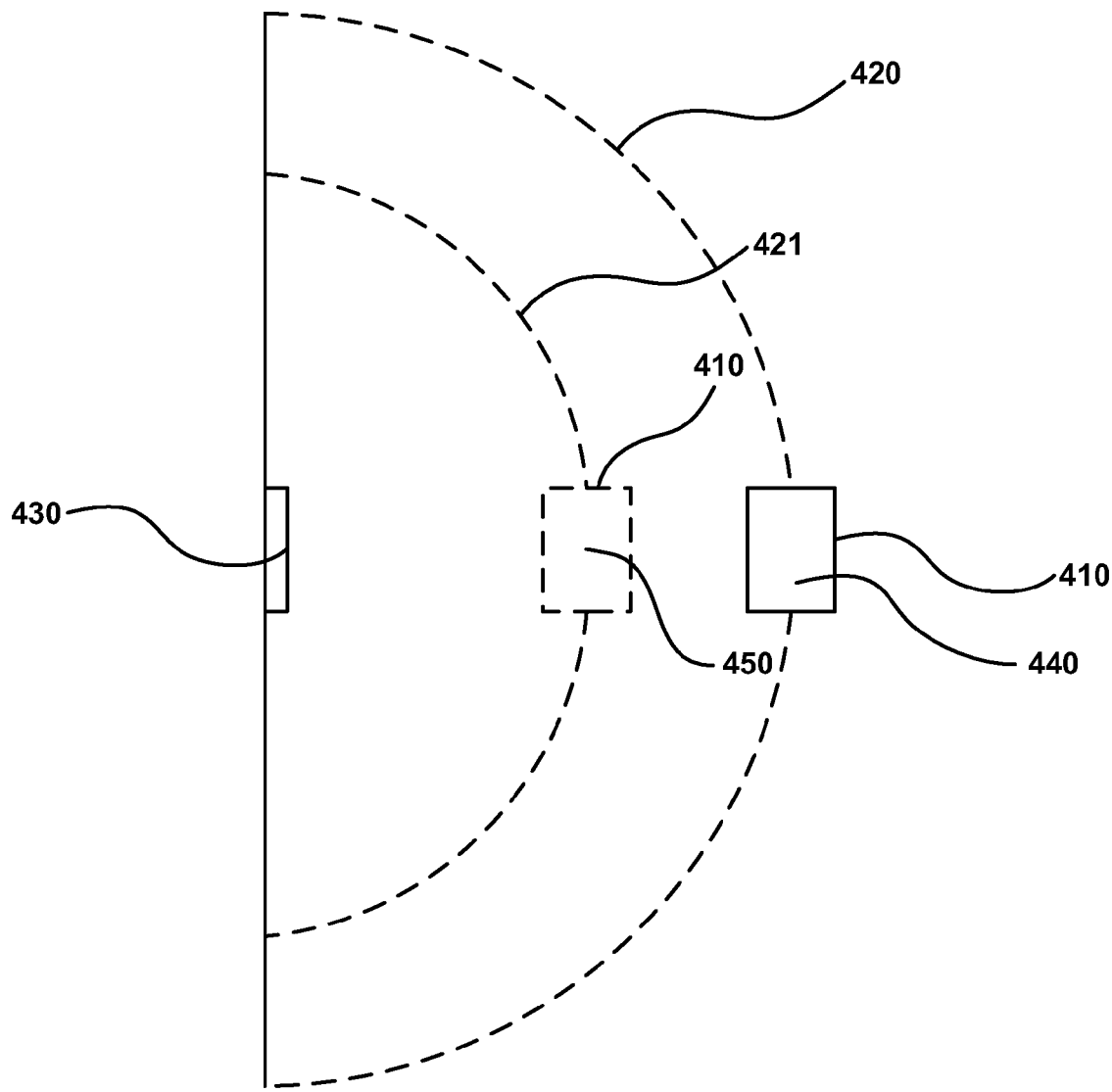
FIG. 4 illustrates an example of a visual-collaborative system, in accordance with an embodiment of the present invention.

FIG. 4 illustrates a visual-collaborative system 400, in accordance to an embodiment. Visual-collaborative system 400 includes a camera (not shown), display screen 430 and designated proximity area 420. In one embodiment, designated proximity area 420 dynamically and automatically changes according to a location of user 410 with respect to display screen 430.

For example, when user 410 is at location 440, designated proximity area 420 (the area within arc 420) is based on location 440 of user 410. Accordingly, when user 410 changes positions to location 450, designated proximity area 421 (the area within arc 421) is based on location 450 of user 410.

In reference to FIG. 2, input signals 205 can be audio, visual and/or touch system signals. Likewise, output signals 207 to any remote location can be audio, visual and/or touch system signals.

Proximity privacy controller 232 can also be configured to activate system 200 if the system turns itself off when idle to save energy and communication costs. In another embodiment, microphones (not shown) can be configured to capture sound only from certain areas (e.g., designated proximity area 170) in front of the display screen 140 via beam-forming using an array of microphones. For example, conversations outside of the designated proximity area would not be captured by microphones and overheard by the remote user. Sounds outside the designated proximity area may be garbled or muted.

In one embodiment, privacy controller 230 includes a visual privacy blocker 233 configured to completely block the view of the camera 120 such that no output signals 207 are sent to and subsequently received by a remote user.

System 200 can also include a mirror mode, such that a user would be able to see what kind of image would be displayed to remote viewers under the various privacy settings.

In various embodiments, depending on a remote user's privacy settings, the local user can sense presence of a remote user near the remote user's system via a user presence sensor 240. A local User A can sense the presence of remote User B in the proximity of User B's display screen by, but not limited to, the following: picking up sounds in the immediate area of User B's display screen and transmitting sounds (e.g., transmitting garbled sounds) to User A, conveying object motion to User A via silhouettes, or via a scrambled sampling of image pixels obtained from User B's camera.

Based on the sensing a presence of remote User B, local User A can respond to User B and subsequently engage with User B over the system 200. For example, User A can place a call to User B by touching an image on the display screen or by knocking on the display screen. In response to User A's touching and/or knocking on the display screen, User A allows themself to be shown on User B's display screen. However, User A will see no change in the displayed image of User B unless the User B accepts a call from User A. Accordingly, if User B does accept a call from User A, any default state (e.g., still picture, video) disappears and a live audio/visual connection between User A and User B is initiated through respective display screens.

FIG. 5 illustrates a flow chart of a method 500 for controlling privacy for a visual-collaborative system, in accordance with an embodiment of the present invention. In one embodiment, method 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 500 is performed at least by the system of FIG. 1-4.

At 510, images captured at a remote location are displayed on a display screen at a local location. At 520, an image of an object is captured by a camera at the local location for transmission to the remote location.

At 530, privacy at the local location is controlled with respect to the remote location based on transmitting the image comprising a first fidelity in response to the object located in a designated proximity area and transmitting the image comprising a second fidelity in response to the object located outside the designated proximity area. In one embodiment, boundaries of the designated proximity area are adjusted. In another embodiment, the boundaries are automatically adjusted based on a location of the object in the designated proximity area. In a further embodiment, the first fidelity is substantially undistorted and said second fidelity is distorted. In another embodiment, the first fidelity is distorted and the second fidelity is substantially blocked.

In one embodiment, audio comprising a first fidelity in response to the object located in the designated proximity area is transmitted and audio comprising a second fidelity in response to the object located outside said designated proximity area is transmitted. In another embodiment, the first fidelity of the audio is substantially undistorted and the second fidelity of said audio is distorted. In a further embodiment, the first fidelity of the audio is distorted and the second fidelity of the audio is substantially blocked.

Various embodiments of the present invention are thus described. While the present invention has been described in particular embodiments, it should be appreciated that the present invention should not be construed as limited by such embodiments, but rather construed according to the following claims.

What is claimed is:

1. A visual-collaborative device comprising:
   a display screen to display images captured at a remote location;
   a camera to capture an image of a local user to be transmitted to said remote location;

a distance sensor to determine a distance between the local user and the visual-collaborative device; and a privacy controller to, when the visual-collaborative device is using a first privacy setting:

in response to a determination that the distance is greater than a threshold value, transmit a distorted version of said image of the local user to the remote location; and in response to a determination that the distance is not greater than the threshold value, transmit an undistorted version of said image of the local user to the remote location; and, when the visual-collaborative device is using a second privacy setting:

in response to the determination that the distance is greater than the threshold value, not transmit the image to the remote location; and in response to the determination that the distance is not greater than the threshold value, transmit the distorted version of the image to the remote location.

2. The device of claim 1, wherein the threshold value is adjustable.

3. The device of claim 1, wherein the distance sensor is an ultrasonic sensor.

4. The device of claim 1, wherein the privacy controller is to initiate a video call to the remote location in response to the local user knocking on the display screen.

5. The device of claim 1, wherein the visual-collaborative device further comprises a plurality of microphones to capture audio, and wherein said privacy controller is further to:

in response to the determination that the distance is greater than the threshold value, transmit a distorted version of the audio to the remote location; and in response to the determination that the distance is not greater than the threshold value, transmit an undistorted version of said audio to the remote location.

6. The device of claim 5, wherein the plurality of microphones capture the audio using beam-forming.

7. The device of claim 1, wherein the distance sensor is to determine the distance using structured light.

8. The device of claim 1, wherein the camera is located on an opposite side of the display screen from the local user.

9. The device of claim 8, wherein the camera is to capture the image of the local user through the display screen.

10. The device of claim 8, further comprising a projector located on the opposite side of the display screen from the local user.

11. A method comprising:

determining, using a distance sensor, a distance between a local user and a visual-collaborative device, the visual-collaborative device comprising a display screen and a camera;

when the visual-collaborative device is set to a first privacy setting:

in response to a determination that the distance is greater than a threshold value, transmitting a distorted image of the local user to said remote location; and in response to a determination that the distance is not greater than the threshold value, transmitting an undistorted version of the image of the local user to the remote location; and when the visual-collaborative device is set to a second privacy setting:

in response to the determination that the distance is greater than the threshold value, not transmitting the image to the remote location; and in response to the determination that the distance is not greater than the threshold value, transmitting the distorted version of the image to the remote location.

12. The method of claim 11, wherein the threshold value is adjustable.

13. The method of claim 11, wherein the distance sensor is an ultrasonic sensor.

14. The method of claim 11, wherein the distance sensor is to determine the distance using structured light.

15. The method of claim 11, further comprising:

capturing audio from a proximity area using a plurality of microphones;

in response to the determination that the distance is greater than the threshold value, transmitting a distorted version of the audio to the remote location; and in response to the determination that the distance is not greater than the threshold value, transmitting an undistorted version of said audio to the remote location.

16. The method of claim 15, wherein capturing the audio comprises using beam-forming.

17. The method of claim 11, further comprising:

initiating, by the visual-collaborative device, a video call to the remote location in response to the local user knocking on the display screen.

18. The method of claim 11, further comprising:

capturing, using the camera, the image of the local user through the display screen.

* * * * *